(12) United States Patent
Zambergs

(10) Patent No.: US 10,479,509 B2
(45) Date of Patent: Nov. 19, 2019

(54) VENTILATION SYSTEM FOR WIDE-BODIED AIRCRAFT

(75) Inventor: Jurijs Zambergs, Tornesch (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 1158 days.

(21) Appl. No.: 12/268,068

(22) Filed: Nov. 10, 2008

(65) Prior Publication Data

US 2009/0163130 A1    Jun. 25, 2009

Related U.S. Application Data

(60) Provisional application No. 61/015,677, filed on Dec. 21, 2007.

(51) Int. Cl.
| | | |
|---|---|---|
| *B64D 13/06* | (2006.01) | |
| *B64D 13/00* | (2006.01) | |
| *B64D 13/04* | (2006.01) | |

(52) U.S. Cl.
CPC ............. *B64D 13/00* (2013.01); *B64D 13/04* (2013.01)

(58) Field of Classification Search
CPC ......... B64D 13/06; B64D 13/04; B64D 13/00
(Continued)

(56) References Cited

U.S. PATENT DOCUMENTS 5,227,062 A * 7/1993 Olsen ........................ 210/321.6
5,461,882 A * 10/1995 Zywiak ............................ 62/401
(Continued)

FOREIGN PATENT DOCUMENTS

DE    69003266 T    2/1994
DE    19952523 A1    5/2001
(Continued)

OTHER PUBLICATIONS

Held, Control System for Controlling an Adjusting Device Operated by Electric Motor in a Motor Vehicle, WO2007/068362 Jun. 21, 2007.*
(Continued)

*Primary Examiner* — Steven B McAllister
*Assistant Examiner* — Samantha Probst
(74) *Attorney, Agent, or Firm* — Lorenz & Kopf, LLP

(57) ABSTRACT

A ventilation system for a wide bodied aircraft with pressurization cabin which includes: a compressor apparatus with a heat exchanger for drawing air in from an input reservoir and for generating an excess pressure in at least one output reservoir, several air outlets in the pressurization cabin which are connected to the output reservoir of the compressor apparatus, and at least one suction air intake pipe in the pressurization cabin wherein the volume flow through at least one of the air outlets is adjusted each time by a volume flow control member, as well as to a method for manufacturing a ventilation system of this type. So that errors in the arrangement of the orifice plates in the ducts can be traced, and where applicable remedied, rapidly and without great expense it is proposed according to the disclosed embodiments that the volume flow control member includes: an orifice plate with predetermined internal cross-section in one pipe section, an electronic memory for storing orifice plate parameters and a transmission device for transmitting the orifice plate parameters from the memory to an external receiver device.

19 Claims, 3 Drawing Sheets

(58) Field of Classification Search
 USPC .......................................................... 454/71
 See application file for complete search history.

(56) References Cited

U.S. PATENT DOCUMENTS

| | | | | |
|---|---|---|---|---|
| 5,495,769 A | * | 3/1996 | Broden | G08C 19/02 73/718 |
| 5,695,396 A | * | 12/1997 | Markwart et al. | 454/76 |
| 6,783,085 B2 | * | 8/2004 | Xu | F02M 61/162 239/463 |
| 6,848,635 B2 | * | 2/2005 | Xu | F02M 61/162 239/502 |
| 6,960,887 B2 | * | 11/2005 | Strang | H01J 37/32449 315/111.21 |
| 6,963,043 B2 | * | 11/2005 | Fink | H01J 37/32642 118/723 R |
| 7,256,996 B2 | * | 8/2007 | Egbert et al. | 361/695 |
| 7,703,613 B2 | * | 4/2010 | Haslem | 210/513 |
| 2001/0007337 A1 | | 7/2001 | Buchholz | |
| 2003/0030568 A1 | * | 2/2003 | Lastinger et al. | 340/825.49 |
| 2007/0114641 A1 | * | 5/2007 | Goh et al. | 257/676 |
| 2007/0184775 A1 | * | 8/2007 | Perkins et al. | 454/273 |
| 2007/0271043 A1 | * | 11/2007 | Ellender | G01F 1/363 702/45 |

FOREIGN PATENT DOCUMENTS

DE 10000669 A1 7/2001
JP 2006349307 A 12/2006

OTHER PUBLICATIONS

German Examination Report dated Dec. 21, 2007.
Informationsforum RFID e.V.: Basiswissen RFID 2.Auglage, Aug. 2007—Firmenschrift.

* cited by examiner

VENTILATION SYSTEM FOR WIDE-BODIED AIRCRAFT

CROSS REFERENCE TO RELATED APPLICATION

This application claims priority to, and the benefit of, U.S. Provisional Patent Application Ser. No. 61/015,677, filed on Dec. 21, 2007, the disclosure of which is incorporated herein by reference in its entirety.

BACKGROUND

1. Field

The disclosed embodiments relate to a ventilation system of a wide-bodied aircraft with a pressurisation cabin according to claim 1 and claim 16 respectively. More particularly the disclosed embodiments relate to a ventilation system for an aircraft with pressurisation cabin which comprises a compressor apparatus, several air outlets and at least one suction air intake pipe in the pressurisation cabin. The volume flow through the air outlets is set each time by a volume flow control member.

2. Brief Description of Related Developments

It is generally known that a system for ventilating the cabin of an aircraft comprises an air supply which draws fresh air in from the atmosphere outside of the aircraft in order to direct it into the cabin of the aircraft wherein the pressure in the cabin has to be adapted appropriately to the human organism, i.e. is to correspond at least to the pressure of 2000 m above sea level. The used air is drawn out through an extraction device in the cabin and directed to the outside. The air supply comprises as a rule a compressor which is driven by the engines of the aircraft and is connected to an air-conditioning device. The extraction device utilises the pressure difference between the outside and inside of the aircraft and comprises pressure control valves. This extraction device can likewise contain a turbine with which a part of the energy of the spent air can be recovered, more particularly to boost the drive motor of the supply compressor.

Particularly in the case of wide-bodied aircraft in which the interior is divided into a number of compartments such supply and extraction devices alone are not sufficient to guarantee correct ventilation. It is then necessary to provide means which permit air circulation in the interior of the aircraft.

In modern aircraft such as for example AIRBUS A 310 and A 320 or BOEING 727, 747, 757 and 767 the air circulation units contain a network of ventilation ducts and a number of electric fans of which some blow the air into the ducts and others suck the air out from the ducts. The ducts run in the floor in the aircraft in the compartments either side of the gangway and in the ceiling appliances above each seat (passenger seat units, PSUs). The circulation devices comprise a blower and a suction filter which are preferably mounted on a common shaft and are driven by a common electric motor. The fans are located underneath the floor of the cabin. An air mixer mixes fresh air from the supply device and air which was returned from inside the cabin, and distributes the mixed air into the compartments above the floor.

A ventilation system of this kind is known from DE 690 03 266 T2.

The ventilation system in the case of commercial aircraft thus comprises numerous air outlets and branch lines. The air flow through each of these air outlets is determined by fixed orifice plates installed in front of the respective air outlet to define the cross-section available for the flow. Thus by way of example the air flow through an air outlet which is located close the compressor of the air supply has to be reduced. On the other hand the air flow through an air outlet which is located further away from the compressor has to reach the cabin unobstructed as far as possible. In the first case therefore it is favourable to select a relatively small cross-section for the orifice plate. In the second case a large cross-section will be selected in order to compensate for the drop in pressure over the pipe system.

It is evident per se that exchanging such orifice plates at the two locations in the aircraft would lead to undesired effects resulting in an unfavourable air exchange in the cabin and possibly even leading to a permanent draught in the cabin. If an error of this type is discovered in the ventilation system after the ventilation system has been installed then extensive checks have to be made to trace the fault and find its cause. According to the prior art for this the pipe system of the ventilation system has to be dismantled at least in part in order to be able to then replace the defective or transposed orifice plates. However it is not always possible to localise the fault precisely so that in some circumstances the ventilation system has to be opened up at several locations in order to be able to replace the faulty orifice plate. It may indeed be the case that as a result of wrongly inserted orifice plates an air flow is produced in the cabin, but the presence of such air flow can still not automatically recognise which orifice plate was inserted just wrongly or whether there are perhaps even several orifice plates which have to be exchanged.

The procedure up until now according to the prior art is thus very laborious and does not always lead directly to the desired success.

SUMMARY

It is therefore the aspect of the disclosed embodiments to produce a ventilation system in which an error in the arrangement of the orifice plates in the ducts can be localised, and where applicable remedied, rapidly and without great expense, as well as to provide a method for constructing and servicing a ventilation system of this kind.

This is achieved through the ventilation system for a wide-bodied aircraft having a pressurisation cabin according to claim 1 as well as through the method for manufacturing a ventilation system for a wide-bodied aircraft having a pressurisation cabin according to claim 16. Preferred embodiments form the subject of the respective dependent claims.

The disclosed embodiments are based on the idea of identifying and examining installation-critical parts well as the volume flow control members through remote enquiry so that they may be purposefully dismantled where appropriate. For this it is proposed according to the disclosed embodiments to undertake this via a corresponding radio link. Particularly suitable for this is fitting the installation-critical components with corresponding RFIDs in which an identification of the respective orifice plate can be lodged in the memory.

Correspondingly the ventilation system according to the disclosed embodiments for a wide-bodied aircraft with pressurisation cabin which comprises a compressor apparatus with heat exchanger for drawing air in from an input reservoir and for producing an excess pressure in at least one output reservoir, several air outlets in the pressurisation cabin which are connected to the output reservoir of the compressor apparatus, and at least one suction air intake pipe in the pressurisation cabin wherein the volume flow through at least one of the air outlets is set each time by a volume flow control member, is characterised in that the volume flow control member comprises an admission orifice plate with a predetermined internal cross-section in a pipe section, an electronic memory for storing orifice plate parameters and a transmitter unit for transmitting the orifice plate parameters from the memory to an external receiver.

The ventilation system is preferably completed in that the admission orifice plate with the predetermined internal cross-section is a perforated plate which stands substantially transversally to an air stream in the pipe section, the perforated plate has a number of through bores, the perforated plate has a border area with a predetermined width, the memory and the transmitter unit are mounted on the border area of the perforated plate, the transmitter unit comprises an antenna which is mounted on the border area of the perforated plate, the overall length of the antenna is a quarter to three quarters of the periphery of the perforated plate and more particularly is half as long as the periphery of the perforated plate, the perforated plate has at least one longitudinal section which stands substantially parallel to a stream in the pipe section, the memory and the transmitter unit are mounted on the longitudinal section of the perforated plate, the transmitter unit comprises a transponder for inductively injecting electrical energy into the memory and the transmitter unit, the memory and the transmitter unit are integrated into an RFID circuit the transmitter unit operates on a transmission frequency between 100 and 150 kHz, the transmitter unit operates on a transmission frequency which is above 850 MHz and preferably at 2.45 GHz, the output reservoir comprises a ducting system in which the pipes of the ducting system are made of carbon fibre reinforced plastics, or the admission orifice plate is mounted in a transition area between two pipe sections in which the electromagnetic damping of the material is lower.

It is self-evident that these features can each be implemented individually or, where this is technically possible and advisable, can be implemented in combination with one another.

The method according to the disclosed embodiments for manufacturing a ventilation system for a wide-bodied aircraft with a pressurisation cabin which comprises the installation of a compressor apparatus with heat exchanger for drawing air in from an input reservoir and for producing an excess pressure in at least one output reservoir, the installation of several air outlets in the pressurisation cabin which are connected to the output reservoir of the compressor apparatus, the installation of at least one air intake pipe in the pressurisation cabin and the installation of a volume flow control member before each at least one of the air outlets for adjusting the volume flow through the air outlet, is characterised by fitting the volume flow control member with an admission orifice plate having a predetermined internal cross-section in a pipe section, mounting an electronic memory for storing orifice plate parameters on the volume flow control member and mounting a transmission device on the volume flow control member for transmitting orifice plate parameters from the memory to an external receiver device.

The method is preferably completed in that the orifice plate parameters comprise at least one internal cross-section of the orifice plate, the transmission device is fed with inductively coupled energy, the transmission device operates on a transmission frequency between 100 and 150 kHz, the transmission device operates on a transmission frequency which lies above 850 MHz and preferably at 2.45 GHz.

Also with the method the last-mentioned features can each be implemented individually or in combination with one another.

The advantages of the disclosed embodiments consist inter alia in that there is practically no further increase in weight linked with the additional fitting out of the ventilation system. Furthermore already existing ventilation systems can be successively upgraded when an orifice plate has to be replaced during maintenance work. Furthermore the orifice plate parameters can be interrogated at any time, and if a refit of the cabin is due or it becomes apparent during operation of the aircraft that there are undesired air flows in the cabin then individual orifice plates can be purposefully replaced.

Further features and advantages of the disclosed embodiments are apparent from the following description of preferred embodiments, with reference being made to the accompanying drawings.

BRIEF DESCRIPTION OF THE DRAWINGS

The illustrations in the drawings are not to scale. The same or similar acting elements are provided with the same reference numerals unless stated otherwise.

DETAILED DESCRIPTION OF THE DRAWINGS

Figure 1:
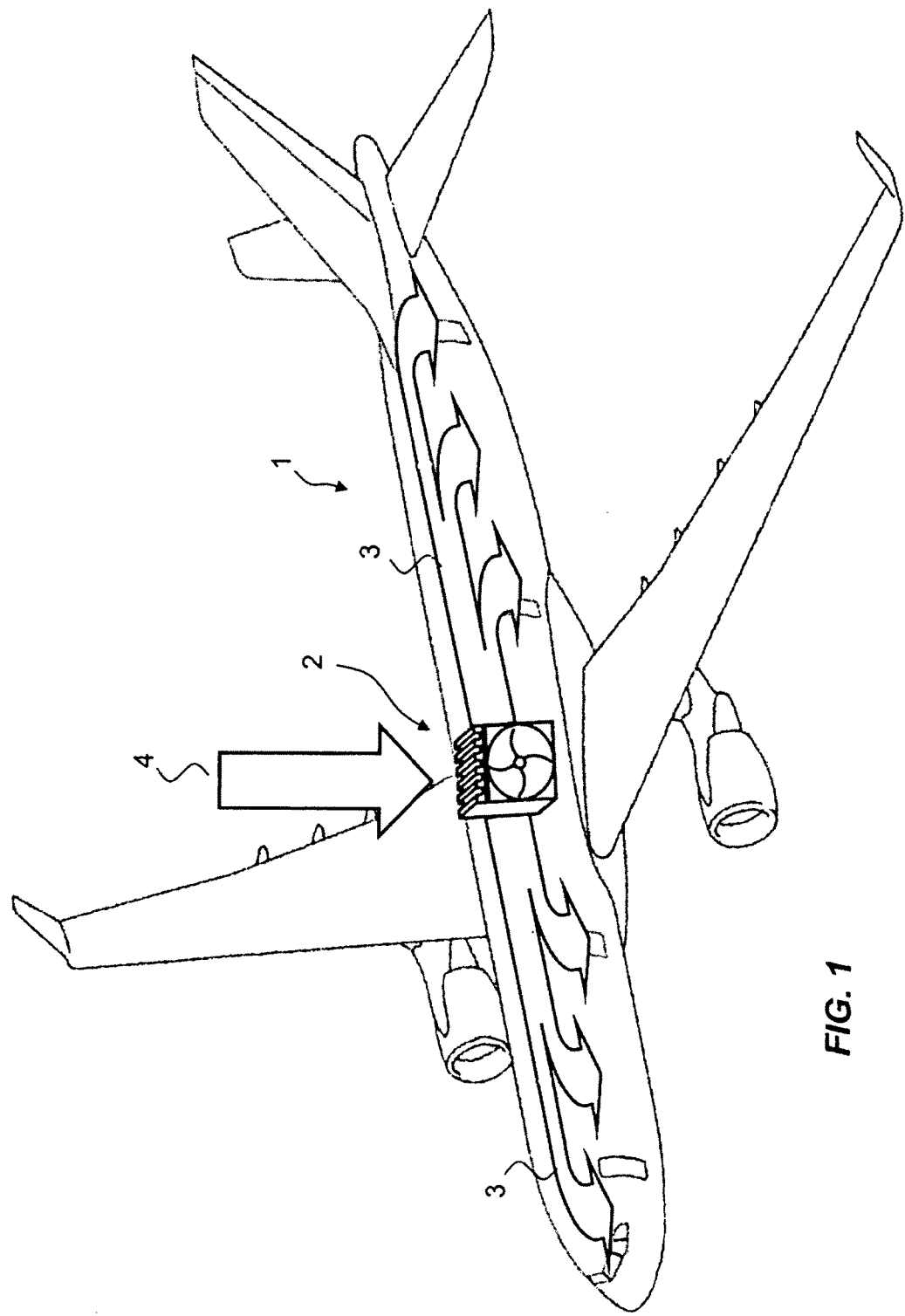
FIG. 1 shows diagrammatically an aircraft with ventilation unit according to the prior art.

FIG. 1 shows diagrammatically an aircraft 1 with pressurisation cabin (not shown) which is equipped with a ventilation unit according to the prior art. This comprises a ventilation system for supplying air and safeguarding a pressure in the cabin suitable for passengers. For this the ventilation system comprises a compressor apparatus 2 which on the one hand brings air from an input reservoir up to the required pressure and on the other hand discharges the heat arising thereby via a heat exchanger so that it can be used by way of example for heating up other fluids in the aircraft.

The pressurised air from the compressor is distributed in the aircraft via ducts so that overall the air distribution marked 3 is produced in the cabin. It must thereby be ensured that when supplying the cabin not only the compartments lying closest to the compressor are supplied but that those compartments lying further away are also taken into account. The volume flow control members provided for this purpose according to the disclosed embodiments are explained below with reference to FIG. 2.

Figure 2:
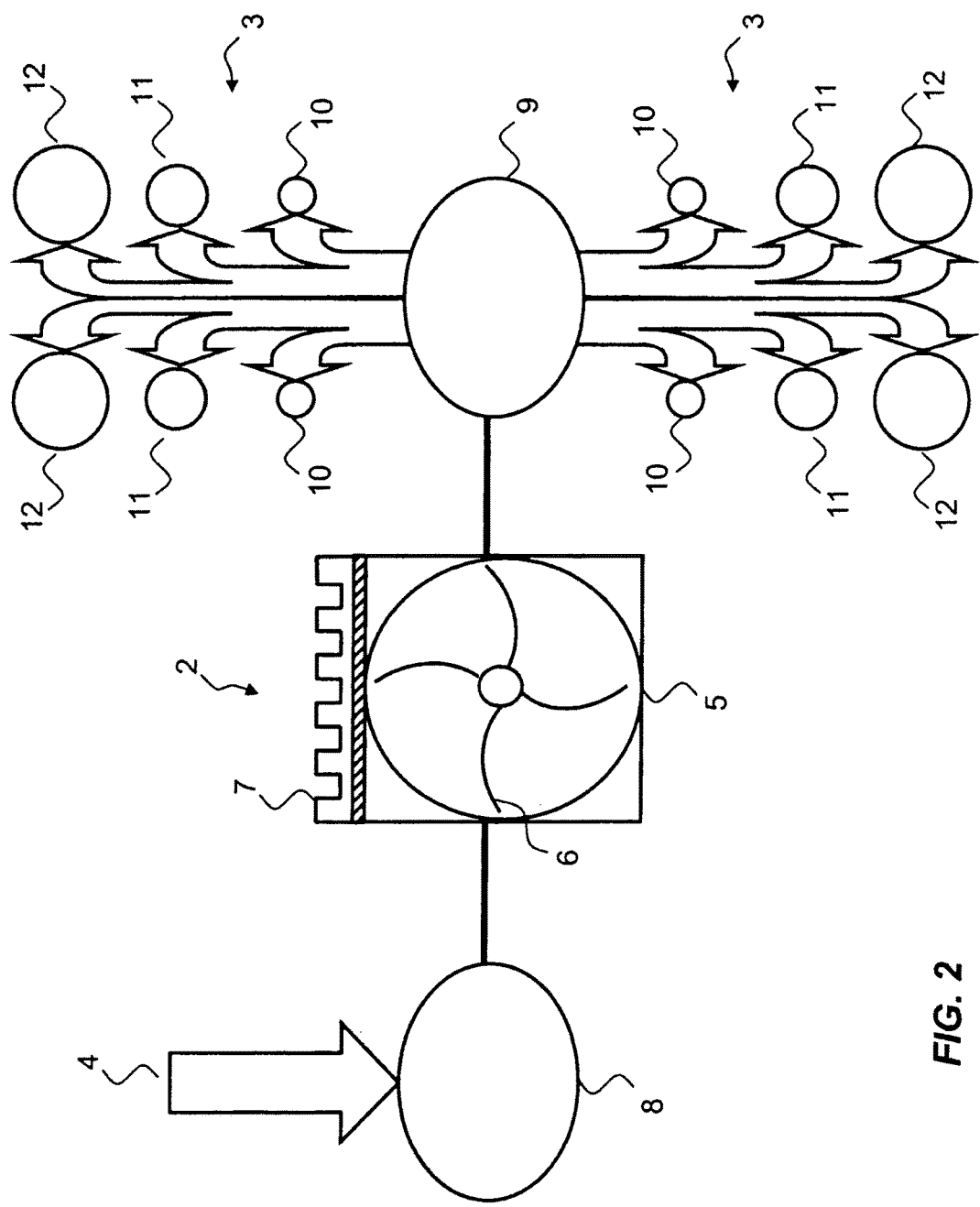
FIG. 2 shows diagrammatically an embodiment of the ventilation unit according to an embodiment.

FIG. 2 shows an input reservoir 8 from which the compressor 2 is supplied with air. The input reservoir is supplied by way of example with air from outside, which is shown by the double arrow 4 both in FIG. 1 and FIG. 2. From the air in the input reservoir 8 having an input pressure $p_E$ the compressor 2 generates in a chamber 5 air in an output reservoir 9 with a pressure $p_A$, whereby the pressure $p_A$ in the output reservoir is higher than the pressure $p_E$ in the input reservoir. A paddle wheel with paddles 6 rotates in the chamber 5 so that the air is compressed. The compressor 2 is thereby driven by the engines (not shown) of the aircraft 1. The heat arising during compression is discharged via a thermo-technically coupled heat exchanger 7. For simplicity and clarity the heat exchanger 7 is shown by a series of cooling fins.

The compressor apparatus 2 can undertake further tasks regarding the processing of the air for the pressurisation cabin, in addition to air compression. Thus for example it can comprise a purifying device (not shown) for purifying the air drawn in from the input reservoir. A heating assembly/cooling assembly (not shown) can be provided in order to adjust the temperature of the air in the output reservoir 9 to a desired level. Finally a humidifying device (not shown) can also be provided in the output reservoir 9 in order to adjust the relative humidity in the output reservoir 9 accordingly.

From the output reservoir 9 in which a higher pressure prevails than in the cabin the air is directed via a ventilation system 3 to different places in the cabin. So that not all the pressurised air or at least a considerable part of it reaches the cabin at the first air outlet, volume flow control members 10, 11, 12 are provided which adjust the dynamic pressure before each outlet nozzle in the cabin accordingly. The air flow through the nozzle which is closest to the compressor 2 is thereby artificially reduced whilst the air flow at the last nozzle, seen from the compressor, passes with as little obstruction as possible. This is achieved through different volume flow control members and is indicated in FIG. 2 by different sized circles 10, 11, 12, wherein the size of the circles corresponds to the internal diameter of a volume flow control member and increases at increasing distance from the compressor.

In the pressurisation cabin there are several air outlets (not shown) which are connected to the output reservoir 9 of the compressor apparatus 2, and as a rule a corresponding number of air intake pipes are distributed in the pressurisation cabin in order to guide the spent air out again.

Figure 3A:
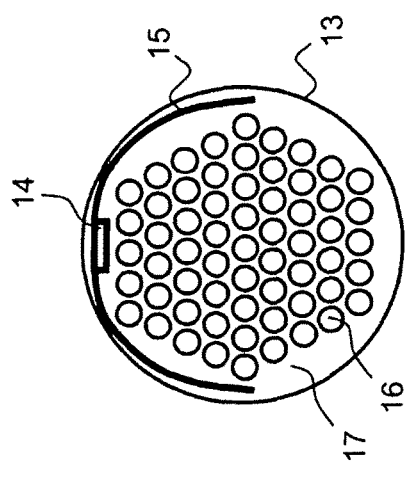
FIGS. 3A and 3B each show embodiments for the orifice plates with an RFID circuit.
Figure 3B:
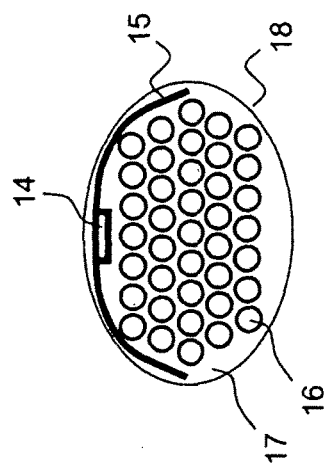

FIGS. 3A and 3B show practical examples for volume flow control members which take the form of perforated plates. A first perforated plate 13 is shown in FIG. 3A. The perforated plate has a number of bores 16 through which the internal diameter of the perforated plate 13 is fixed for the air flowing through it. The internal diameter of the orifice plate 13 is the most important parameter for the following explanations.

An electronic circuit 14 is mounted on a border area 17 of the perforated plate 13, as will be explained in detail below. The circuit serves to store the parameters of the orifice plate. It therefore comprises an electronic memory (not shown) which can be written up. This memory is in particular an EPROM or an EEPROM which is written up with the orifice plate parameters such as for example the number of bores 16, prior to installation into the perforated plate. Equally in addition to or instead of this the diameters of the bores can be stored. Further modifications of this kind are familiar to the person skilled in the art and therefore need not be explained in further detail here.

Apart from a memory a transmitter chip (not shown) is also integrated in the chip 14. This serves to transmit the data from the memory to a receiver (not shown) in order to enable the control and evaluation of the installed orifice plate 13 to be monitored remotely. For this it is connected to an antenna 15 which establishes a suitable electromagnetic field for the transmission of data. Both the chip 14 and the antenna 15 are arranged in the illustrated embodiment of the orifice plate 13 in a border area 17 of the plate 13. This arrangement is then offered if there is not sufficient space in the centre area of the orifice plate 13 as in the illustration. For reasons of stability however the border area is as a rule designed so that a broad strip around the periphery of the plate remains without bores. It is thus practically always possible to place the chip 14 with memory and transmitter and the antenna 15 there.

The length of the antenna arises from the demands on the frequency of the radiation and amplitude. It is in fact very difficult to produce a sufficiently strong electromagnetic field, particularly if the orifice plate is located in a strongly damping environment. On the other hand it is not always guaranteed that there is sufficient space available on the orifice plate 13, in order to be able to fit a very extended antenna thereon. The inventor has found that an optimum compromise exists in placing the antenna 15 of the chip 14 on the edge of the orifice plate 13 so that it extends between a quarter and three quarters of the periphery and in particular over roughly half the periphery of the plate. Furthermore however fundamentally different antenna geometries such as wound conductor paths can be used. The length and the precise shape of the antenna depend on the transmission frequency used and in particular on whether the transmission frequency is in the kHz range or in the GHz range. Basically frequencies between 100 and 150 kHz, between 800 MHz and 1 GHz as well as above 2 GHz, more particularly at 2.45 GHz are considered suitable. The antenna is preferably printed as a conductor path on the orifice plate.

Furthermore it was perceived that the antenna 15 is mounted optically symmetrically around the chip 14, i.e. the branches of the antenna 15 either side of the chip 14 are of equal length. The overall length of the antenna arises in dependence on the damping through the surrounding material, by way of example carbon fibre reinforced plastics, as well as the position in the ventilation pipe and the transmission and receiving frequency used.

It is self-evident that the shape of the orifice plate is of secondary importance and is determined by the shape of the pipe. A different shape than shown in FIG. 3A is illustrated in FIG. 3B. Whereas the orifice plate 13 in FIG. 3A is circular the orifice plate 18 in FIG. 3B has an oval shape. The actual form of the orifice plate which is shown in two embodiments 13 and 18 respectively, is conditioned by the shape of the cross-section of the respective ventilation pipes in the wide-bodied aircraft 1. For the person skilled in the art however it is clear that the efficiency of a dipole antenna increases when the antenna exists in a straight shape so that the efficiency of the antenna in the embodiment 18 of the orifice plate is better than in the embodiment 13 of the orifice plate.

The antenna 15 can in both illustrated cases 13 and 18 as well as in further embodiments (not shown) serve not only for transmitting electromagnetic signals but it can also be used for inductive coupling of energy into the chip 14. This is offered with the orifice plate according to the disclosed embodiments insofar as the chip 14 in the embodiment discussed here operates purely passively. Orifice plate parameters are written in a programmable memory, such as for example an EPROM or an EEPROM. A memory of this kind requires no power supply in order to store information. The data is sent by the transmission stage (not shown) in the chip 14 only on demand. In other words, the transmission stage need be supplied with energy only when data is transmitted from the memory. For this it is only necessary to supply the chip with electric energy at this moment in time. When this is inductively coupled, as soon as the data is to be retrieved, there is no longer the necessity to have to provide an energy accumulator such as a battery on the orifice plate. The need for regular maintenance of the orifice plates in the installed position in turn also no longer exists.

Figure 4:
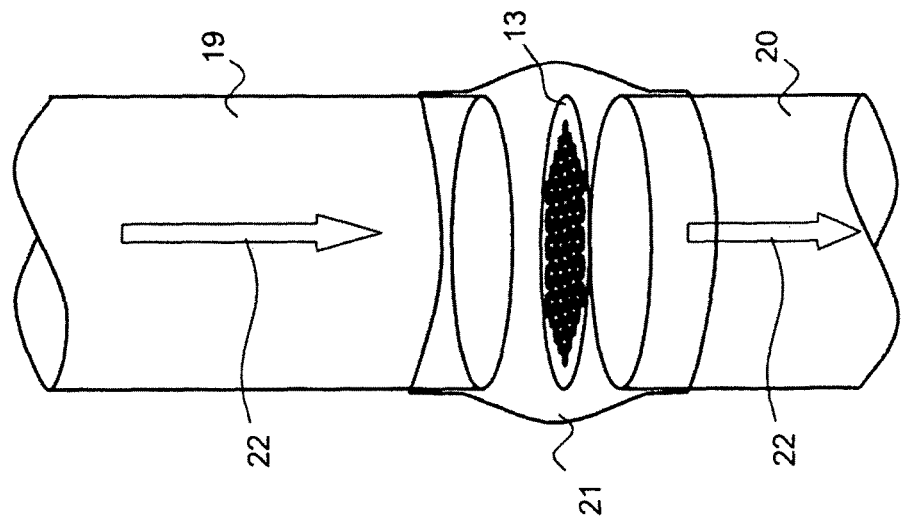
FIG. 4 shows an example for the arrangement of an orifice plate according to the disclosed embodiments in a ventilation pipe with join.

With the arrangement of the orifice plates according to the disclosed embodiments with RFID chip 14 in the ventilation pipes it is also advantageous to install these at sites where the damping of the electromagnetic radiation is low. An installation site for the orifice plate 13 of this kind is illustrated in FIG. 14. As a rule the ventilation system is not composed of welded pipes but joining sleeves are provided at the appropriate places. One such joining sleeve 21 between the first pipe section 19 and a second pipe section 20 is illustrated in FIG. 4. Whereas the pipe sections 19, 20 are made from shape-stable material such as for example carbon fibre reinforced plastics the sleeve 21 is preferably moulded from a flexible material such as for example rubber. Thus apart from providing a connection curvatures in the pipeline can also be compensated, and it is possible in this way to uncouple acoustically two flow-connected pipe sections as well as to compensate for installation and production tolerances in the case of the pipes. Since the damping of electromagnetic radiation by the carbon fibre reinforced plastics is considerable, according to the disclosed embodiments it is proposed to arrange the orifice plate with RFID chip 14 in the area of the sleeve 21. Here the damping is very much smaller, and reading the orifice plate parameters with a receiver can be carried out more easily.

In the above description, it was assumed that the orifice plate is flat, wherein it stands substantially perpendicular to a flow 22 in a pipe section 19, 20. Furthermore it was assumed that the orifice plate 13, 18 has a sufficiently wide border area 17. Both of these however need not be absolutely necessary. Thus the orifice plate can also have a longitudinal section (not shown) which extends substantially in or against the direction of the air flow 22. This longitudinal section can extend over a part of the periphery of the orifice plate or however over the entire periphery of the orifice plate so that a short pipe is produced. In this case the chip 14 can be mounted with the antenna 15 on the longitudinal section. It is evident to the person skilled in the art that a short pipe has a higher stability and is particularly suitable for large internal orifice plate diameters.

The essential feature of the disclosed embodiments is that the chip 14 and the antenna 15 are fixedly connected to the orifice plate 13 or 18 so that false parameters are not wrongly attributed to an orifice plate through inadvertently mixing up the chip 14 and antenna 15 on the one hand and the orifice plate 13, 18 on the other.

When reading the orifice plate parameters through a mobile reading device (not shown) an automatic assignment of the installation site and type of orifice plate can then automatically take place so that a simple "correct"/"incorrect" announcement will be displayed to the user on a screen of the mobile reading device. Checking the ventilation system is thus possible in a time-saving and very simple manner.

This method can be simplified even more for the user by the installation site being automatically interrogated by the reading device. For this the momentary site of the mobile reading device can be determined by locally fixed transponders installed in the aircraft.

LIST OF REFERENCE NUMERALS

1 Aircraft
2 Air supply unit
3 Air distribution in cabin
4 Air supply from air supply unit
5 Compressor apparatus, chamber
6 Paddles of the compressor apparatus
7 Heat exchanger (cooling fins)
8 Input reservoir
9 Output reservoir
10 First volume flow control member
11 Second volume flow control member
12 Third volume flow control member
13 Admission orifice plate, first embodiment
14 RFID chip with transmission device and memory
15 Antenna
16 Bore of orifice plate
17 Border area of orifice plate
18 Admission orifice plate, second embodiment
19 First pipe section
20 Second pipe section
21 Sleeve, connection between first and second pipe section
22 Flow in pipe section

The invention claimed is:

1. A ventilation system for a wide-bodied aircraft with a pressurization cabin, the ventilation system comprising:
 a compressor apparatus with a heat exchanger for drawing air in from an input reservoir and for generating an excess pressure in at least one output reservoir,
 several air outlets in the pressurization cabin which are connected to the at least one output reservoir of the compressor apparatus,
 at least one suction air intake pipe in the pressurization cabin,
 a static volume flow control member for adjusting a volume flow through at least one of the air outlets,
 wherein the static volume flow control member comprises:
 an admission orifice plate with a predetermined internal cross-section in a pipe section, wherein the admission orifice plate with the predetermined internal cross-section is a perforated plate which stands substantially transversally to an air stream in the pipe section,
 an electronic memory coupled to the admission orifice plate for storing orifice plate parameters, the orifice plate parameters are indicative of the non-changeable internal cross-section of the orifice plate for the air flowing through it, and
 a transmission device coupled to the admission orifice plate for transmitting the orifice plate parameters from the electronic memory to an external receiver device.

2. A ventilation system according to claim 1 wherein the perforated plate has a number of through bores.

3. A ventilation system according to claim 1 wherein the perforated plate has a border area with a predetermined width.

4. A ventilation system according to claim 3 wherein the electronic memory and the transmission device are mounted on the border area of the perforated plate.

5. A ventilation system according to claim 4 wherein the transmission device comprises an antenna which is mounted on the border area of the perforated plate.

6. A ventilation system according to claim 5 wherein the overall length of the antenna is a quarter to three quarters of a periphery of the perforated plate.

7. A ventilation system according to claim 1 wherein the perforated plate has at least one longitudinal section which stands substantially parallel to the air stream in the pipe section.

8. A ventilation system according to claim 7 wherein the electronic memory and the transmission device are mounted on the longitudinal section of the perforated plate.

9. A ventilation system according to claim 1 wherein the transmission device comprises a transponder for the inductive coupling of electrical energy into the electronic memory and the transmission device.

10. A ventilation system according to claim 1 wherein the transmission device operates on a transmission frequency between 100 and 150 kHz.

11. A ventilation system according to claim 1 wherein the transmission device operates on a transmission frequency which lies above 850 MHz.

12. A ventilation system according to claim 1 wherein the at least one output reservoir comprises a ducting system comprising pipes made from carbon fibre reinforced plastics.

13. A ventilation system for a wide-bodied aircraft with a pressurization cabin, the ventilation system comprising:
    a compressor apparatus with a heat exchanger for drawing air in from an input reservoir and for generating an excess pressure in at least one output reservoir,
    several air outlets in the pressurization cabin which are connected to the at least one output reservoir of the compressor apparatus,
    at least one suction air intake pipe in the pressurization cabin,
    a static volume flow control member for adjusting a volume flow through at least one of the air outlets,
    wherein the static volume flow control member comprises:
        an admission orifice plate with a predetermined internal cross-section in one pipe section,
        an electronic memory coupled to the admission orifice plate for storing orifice plate parameters, the orifice plate parameters are indicative of the non-changeable internal cross-section of the orifice plate for the air flowing through it, and
        a transmission device coupled to the admission orifice plate for transmitting the orifice plate parameters from the electronic memory to an external receiver device, wherein the electronic memory and the transmission device are integrated in an RFID circuit.

14. A method for manufacturing a ventilation system for a wide-bodied aircraft with a pressurization cabin, the method comprising:
    installing a compressor apparatus with a heat exchanger for drawing air in from an input reservoir and for generating an excess pressure in at least one output reservoir,
    installing several air outlets in the pressurization cabin which are connected to the at least one output reservoir of the compressor apparatus,
    installing at least one suction air intake pipe in the pressurization cabin,
    installing a static volume flow control member before at least one of the air outlets for adjusting the volume flow through the at least one air outlet,
    fitting the static volume flow control member with an orifice plate having a predetermined internal cross section in one pipe section,
    mounting an electronic memory for storing orifice plate parameters on the orifice plate, the orifice plate parameters are indicative of the non-changeable internal cross-section of the orifice plate for the air flowing through it, and
    mounting a transmission device on the orifice plate for transmitting the plate parameters from the electronic memory to an external receiver device, wherein when the plate parameters are read by a mobile reading device, an automatic assignment of an installation site and type of plate takes place.

15. A method according to claim 14 wherein the orifice plate parameters comprise at least the internal plate cross-section of the orifice plate.

16. A method according to claim 14 wherein the transmission device is fed with inductively coupled energy.

17. A ventilation system according to claim 14 wherein the transmission device operates on a transmission frequency between 100 and 150 kHz.

18. A method according to claim 14 wherein the transmission device operates on a transmission frequency which lies above 850 MHz.

19. A method according to claim 14 wherein the installation site is ascertained through locally fixed transponders installed in the aircraft.

* * * * *